(12) United States Patent
Clough

(10) Patent No.: US 11,453,322 B2
(45) Date of Patent: Sep. 27, 2022

(54) ADJUSTABLE HEADREST WITH NECK SUPPORT

(71) Applicant: Robert Clough, Santa Fe Springs, CA (US)

(72) Inventor: Robert Clough, Santa Fe Springs, CA (US)

( * ) Notice: Subject to any disclaimer, the term of this patent is extended or adjusted under 35 U.S.C. 154(b) by 0 days.

(21) Appl. No.: 17/409,307

(22) Filed: Aug. 23, 2021

(65) Prior Publication Data

US 2022/0063469 A1    Mar. 3, 2022

Related U.S. Application Data

(60) Provisional application No. 63/073,116, filed on Sep. 1, 2020.

(51) Int. Cl.
| | |
|---|---|
| *B60N 2/10* | (2006.01) |
| *B60N 2/58* | (2006.01) |
| *A47C 1/10* | (2006.01) |
| *B60N 2/885* | (2018.01) |
| *B60N 2/806* | (2018.01) |

(52) U.S. Cl.
CPC ............. *B60N 2/885* (2018.02); *B60N 2/806* (2018.02)

(58) Field of Classification Search
CPC ........ B60N 2/885; B60N 2/803; B60N 2/806; B60N 2/24; B60N 2/838; A47C 7/38
See application file for complete search history.

(56) References Cited

U.S. PATENT DOCUMENTS

| | | | |
|---|---|---|---|
| 4,883,243 A | 11/1989 | Herndon | |
| 4,899,961 A | 2/1990 | Herndon | |
| 5,275,462 A | 1/1994 | Pond et al. | |
| 5,370,446 A | 12/1994 | Bancod | |
| 5,934,749 A | 8/1999 | Pond et al. | |
| 6,616,235 B1* | 9/2003 | Khavari ............... | B60N 2/847 297/410 |
| 7,201,448 B2* | 4/2007 | Williamson ....... | B60N 2/01508 297/410 |
| 8,857,911 B2* | 10/2014 | Aguirre .............. | B64D 11/0638 297/188.14 |
| 8,911,018 B2 | 12/2014 | Gaither et al. | |
| 9,028,000 B2* | 5/2015 | Millan ..................... | B60N 2/24 297/391 |
| 9,216,676 B1* | 12/2015 | Reyes Luna .......... | B60N 2/986 |
| 9,481,277 B1 | 11/2016 | Ruelas | |
| 9,566,885 B2 | 2/2017 | Gazit | |
| 9,701,231 B2 | 7/2017 | Arriola et al. | |
| 10,202,196 B2* | 2/2019 | Hontz ............... | B64D 11/0642 |
| 10,220,752 B2 | 3/2019 | Line et al. | |
| 10,399,475 B2* | 9/2019 | Jalpa ..................... | B60N 2/838 |
| 10,703,485 B2* | 7/2020 | Wilcynski .......... | B64D 11/0642 |
| 2004/0195893 A1* | 10/2004 | Clough .................... | A47C 7/38 297/391 |
| 2004/0217639 A1* | 11/2004 | Clough .................... | A47C 7/38 297/391 |
| 2007/0108827 A1* | 5/2007 | Clough .................. | B60N 2/885 297/391 |

(Continued)

*Primary Examiner* — Shin H Kim
(74) *Attorney, Agent, or Firm* — James E. Brunton

(57) ABSTRACT

The present invention relates generally to headrests for seats. More particularly, the invention concerns a fully adjustable headrest with novel neck support members for use in connection with furniture and with passenger vehicles such as aircraft, trains and buses.

10 Claims, 4 Drawing Sheets

(56) References Cited

U.S. PATENT DOCUMENTS

| | | | |
|---|---|---|---|
| 2012/0139309 A1* | 6/2012 | Gaither | B60N 2/882 |
| | | | 297/391 |
| 2013/0234490 A1* | 9/2013 | Millan | A47C 7/38 |
| | | | 297/391 |
| 2013/0312192 A1 | 11/2013 | Lee | |
| 2015/0197170 A1* | 7/2015 | Obukhov | B60R 21/207 |
| | | | 297/391 |

* cited by examiner

ADJUSTABLE HEADREST WITH NECK SUPPORT

CROSS-REFERENCE TO RELATED APPLICATIONS

This is a Non-Provisional application claiming the benefit of co-pending Provisional Application No. 63/073,116 filed Sep. 1, 2020.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Field of the Invention

The present invention relates generally to headrests for seats. More particularly, the invention concerns a fully adjustable headrest with novel neck support members for use in connection with furniture and with passenger vehicles such as aircraft, trains and buses.

Discussion of the Prior Art

Various types of headrests for use in passenger vehicles have been suggested in the past. As the general rule, these headrests are designed primarily to satisfy safety aspects rather than to provide a comfortable seating posture. Typically, the prior art vehicle headrests comprise only a vertically adjustable head support member designed to provide protection against injury in the event of an accident. However, some vehicle headrests have also been provided with lateral headrest elements.

In addition to passenger vehicle headrests, a number of headrests have been designed for use in emergency vehicles. These types of headrests are of a more complicated design and some include greater adjustability features. Exemplary of these types of headrests are those disclosed in U.S. Pat. No. 5,275,462 and in U.S. Pat. No. 5,934,749, both issued to Pond et al.

Even more complex headrests have been designed for use in military aircraft and, more particularly in military aircraft for use in conjunction with ejection seats. Typical of this class of headrest design are those disclosed in U.S. Pat. Nos. 4,883,243 and 4,899,961.

In addition to the development of headrests for use in military aircraft, significant advances have been made in recent years in the design of headrests for use in commercial aircraft. Many of these headrests are designed for personal comfort and include pivotally movable back and lateral supports. In these latter types of headrests, the head support members are typically slidably mounted on spaced apart rods that extend upwardly from the back of the seat and rely on friction to maintain the headrest in an elevated position.

As will become clear from the discussion that follows, the headrest of the present invention represents a substantial improvement over the prior art headrests and in addition to providing greater comfort and safety, also provides support to the neck of the user. More particularly, the headrest of the present invention incorporates adjustable neck supports that swing downwardly from an upper stowed position into a lowered support position on the sides of the user's neck.

SUMMARY OF THE INVENTION

It is an object of the present invention to provide a vertically adjustable headrest that provides both support and comfort to the user and one that is suitable for use in connection with various types of passenger vehicles, including commercial aircraft.

Another object of the invention is to provide a headrest of the aforementioned character that uniquely includes adjustable means for providing support to the neck of the user.

Another object of the invention is to provide a headrest as described in the preceding paragraph in which the means for providing support to the neck of the user includes adjustable wing like supports that swing downwardly from an upper stowed position into a lowered operative position.

Another object of the invention is to provide a headrest as described in the preceding paragraphs in which the adjustable wing like neck supports are pivotally connected to a vertically adjustable head support member by means of a friction hinge.

Another object of the invention is to provide easily adjustable chin support members that are pivotally connected to the side support members by means of constant torque hinges.

Another object of the invention is to provide an adjustable headrest construction of the character described that includes strategically positioned comfort cushions for engagement by the user's neck and head.

DESCRIPTION OF THE INVENTION

Figure 1:
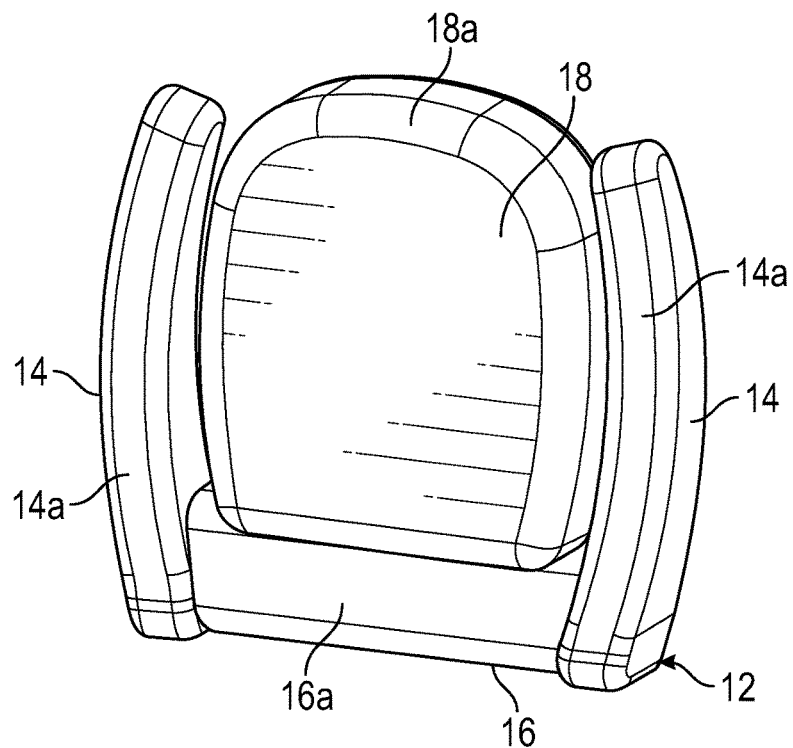
FIG. 1 is a general perspective view of one form of the adjustable headrest of the invention showing the adjustable neck supports in a stowed configuration.
Figure 2:
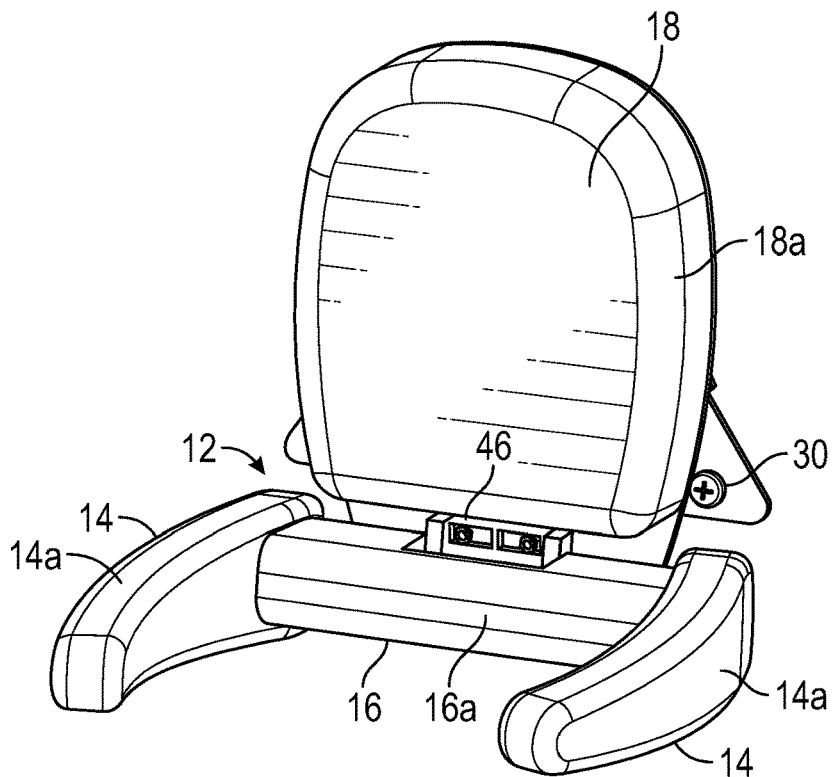
FIG. 2 is a general perspective view of the adjustable headrest, with the neck support deployed downwardly.

Referring to the drawings and particularly to FIGS. 1 and 2, one form of the adjustable seat headrest of the invention is there illustrated as it appears when mounted on a vehicle seat, such as an aircraft seat. An important feature of the seat headrest of the invention is the adjustable neck support assembly 12 that includes first and second neck support wings 14 and a transverse neck support 16. First and second neck support wings 14 are connected to transverse neck support 16 for movement between the first stowed position as shown in FIG. 1 and the second deployed position shown in FIG. 2.

Figure 3:
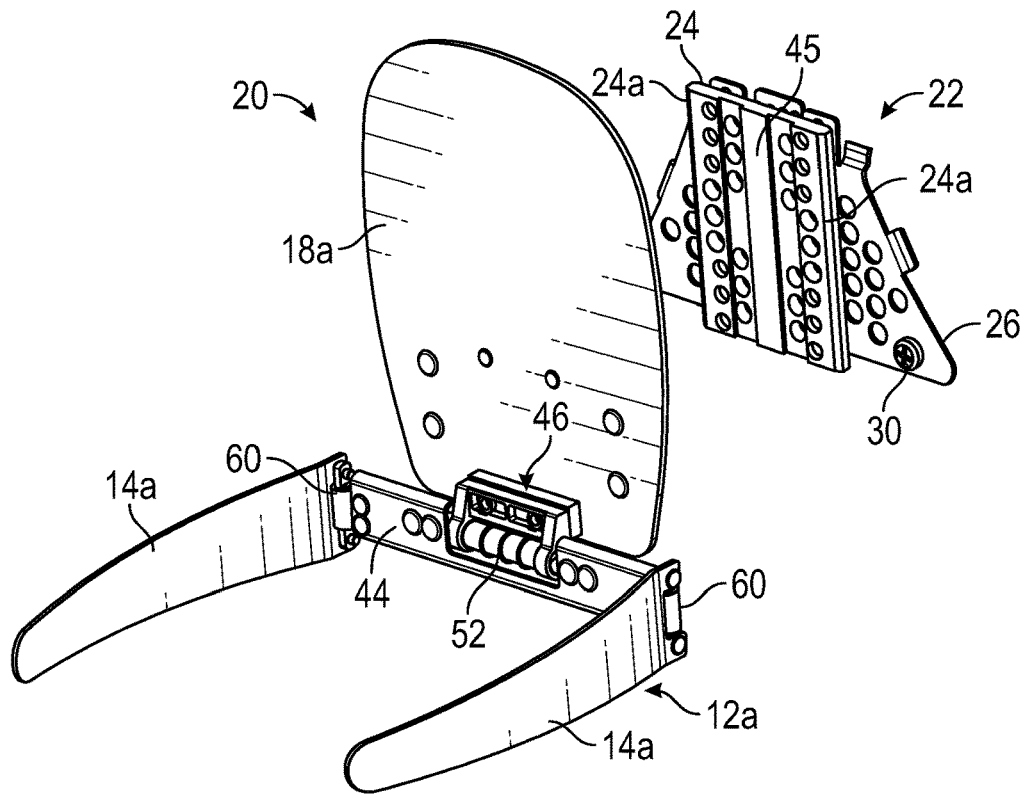
FIG. 3 is a general perspective, exploded view of the structural components of the headrest as they appear with the cushioning removed and with the neck support components of the user support assembly in a downward operative position.
Figure 4:
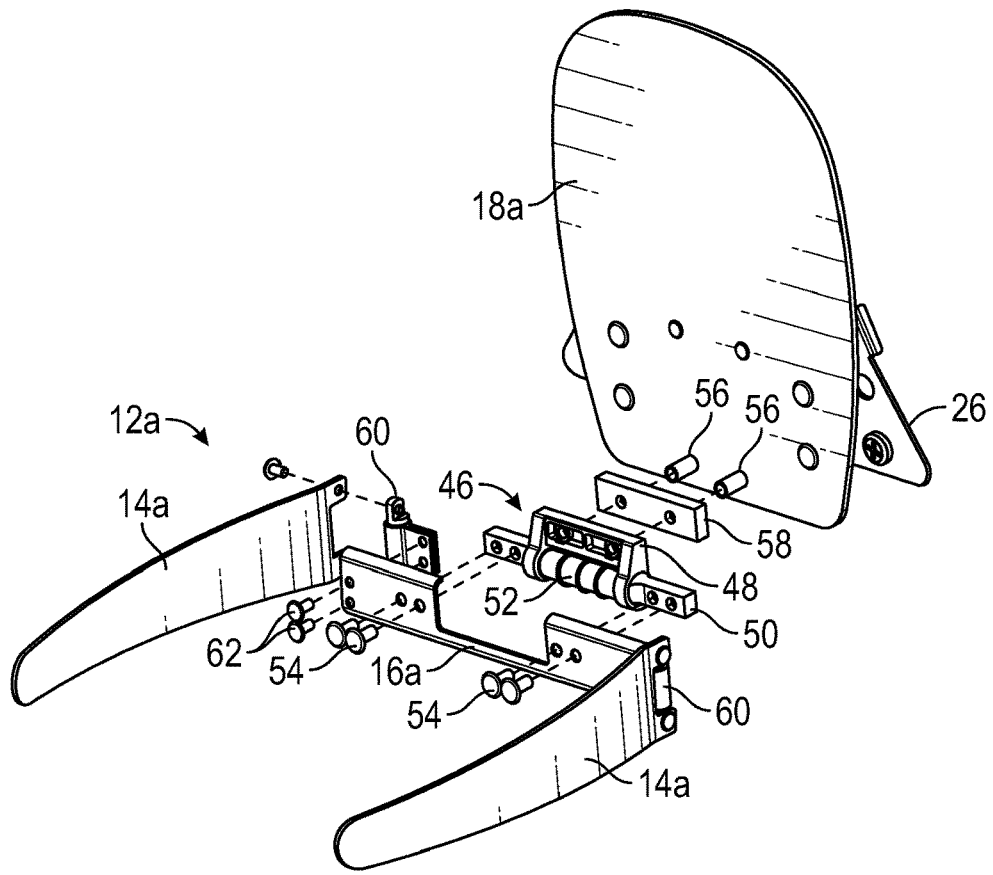
FIG. 4 is a generally perspective exploded view of the structural components of the headrest structure, similar to FIG. 3, but showing the user support assembly partially exploded and separated from the head support assembly.
Figure 6:
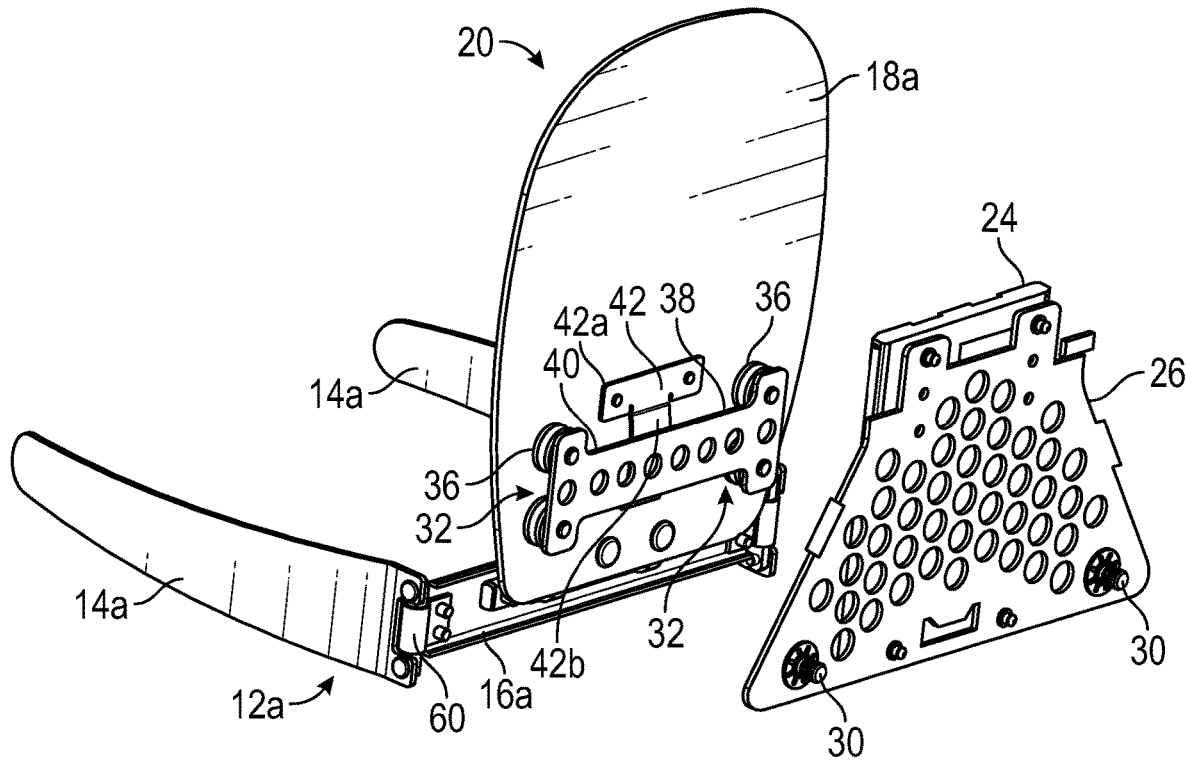
FIG. 6 is a generally perspective exploded view similar to FIG. 5, but showing the user support assembly spaced apart from the seat connector assembly.

As illustrated in FIGS. 3, 4 and 6 of the drawings, the adjustable seat headrest of the present form of the invention comprises a user support assembly 20 and a mounting assembly 22 that can be connected to the vehicle seat by any suitable means. As best seen in FIG. 3, mounting assembly 22 comprises an elongated guide 24 and a seat connector plate 26 that can be connected to the vehicle seat by suitable connectors, such as connectors 30. Elongated guide 24 includes oppositely disposed guide rails 24a which, in a manner presently to be described, are adapted to be rollably engaged by two sets of transversely spaced apart roller assemblies 32 (FIG. 6) that are mounted on central head support plate 18a of passenger support assembly 20. The roller assemblies 32, each of which are of identical construction, include grooved rollers 36 that roll along guide rails 24a so that the user support assembly 20 can be adjustably moved upwardly and downwardly so as to enable the desired adjustment in the height of the support assembly. A transversely extending connector member 38 spans the spaced apart rollers in the manner illustrated in FIG. 6 and defines a guide channel 40 within which guide 24 is disposed.

Figure 5:
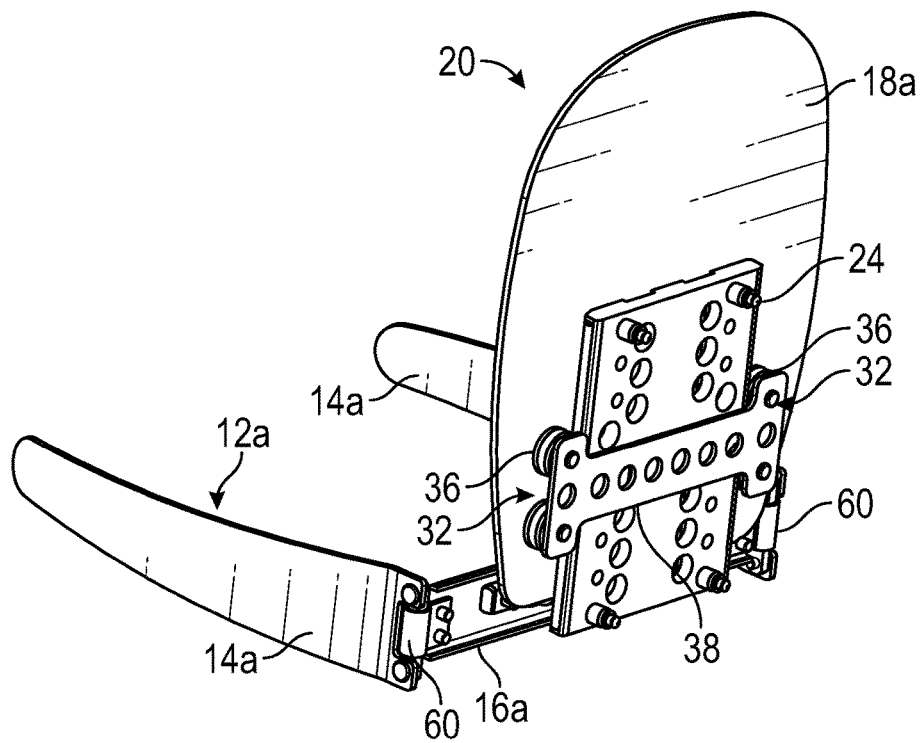
FIG. 5 is a generally perspective rear view of the structural components of the user support assembly showing the elongated guide of the seat connector assembly in position with the spaced apart roller assemblies of the user support assembly.

Forming an important aspect of the headrest assembly of this latest form of the invention is a resistance imparting assembly for imparting resistance to the movement of support assembly 20 upwardly and downwardly relative to guide 24. In the present form of the invention, this novel resistance imparting assembly comprises a uniquely configured, generally T-shaped leaf spring designated in the drawings by the numeral 42. As best seen in FIG. 6, spring 42 includes a transverse connector portion 42a that is affixed to central head support panel 34 and a downwardly extending, curved central portion 42b that extends into channel 40. When the support assembly 20 is mounted on guide 24 in the manner shown in FIG. 5, the curved central portion 42b of the spring will be yieldably deformed so that it is brought into pressural engagement with the guide. With this construction, as the headrest assembly is moved upwardly and downwardly, the central portion 42b of the spring will frictionally engage the surface of an elongated central channel 45 formed in the guide 24 (FIG. 3) and will yieldably resist sliding movement of support assembly 20 relative to the guide.

Referring next to FIGS. 3 and 4 of the drawings, the user support assembly 20 of the invention can be seen to comprise structural neck support assembly 12a which includes a transversely extending connector plate 16a that is hingeably connected to structural support plate 18a by a conventional tilting hinge 46. Connector plate 16a here comprises the structural component of the covered neck support 16 shown in FIGS. 1 and 2 of the drawings. Similarly, structural support plate 18a here comprises the structural component of the covered head support panel 18. Tilting hinge 46 here comprises a connector yoke 48, a shaft 50 rotatably carried by said yoke and a plurality of friction bands 52 circumscribing shaft 50. As shown in FIG. 4, shaft 50 is connected to connector plate 16a by conventional connectors 54 while yoke 48 is connected to support plate 18a by conventional connectors 56. A spacer block 58 is disposed between the support plate and yoke 48. Tilting hinge 46 is readily commercially available from various sources, including Hanaya, Inc. having offices at Pante, Fla.

Connected to either end of connector plate 16a by conventional friction hinges 60 are the structural components 14a of the previously mentioned covered adjustable neck supports 14 shown in FIGS. 1 and 2 of the drawings. Friction hinges 60, which are of conventional construction and are readily available from various sources including Hanaya, Inc. having offices at Pante, Fla. are connected to the connector plates 14a by conventional connectors 62 (FIG. 4).

With the construction described in the preceding paragraphs and with the seat connector plate 26 connected to the vehicle seat by connectors 30, the user support assembly 20 can be quickly and easily adjusted to effectively support the user's neck and to achieve maximum overall comfort to the seated user. More particularly, with the elongated guide 24 of the mounting assemblage 22 disposed within the channel 40, which is defined by the spaced apart rollers 36, guide 24 can be adjustably moved upwardly and downwardly so as to enable the desired adjustment in the height of the support assembly 20. Similarly, the subassembly of the support assembly 20 comprising connector plate 16a and structural elements 14a can be moved against the urging of tilting hinge 46 from the first extended position shown in FIGS. 3 and 4 of the drawings to the second, upward stowed position shown in FIG. 1 of the drawings. In their second extended position, structural elements 14a can be rotated inwardly and outwardly about hinges 60 to enable the desired adjustment of the elements relative to the neck of the user.

Figure 7:
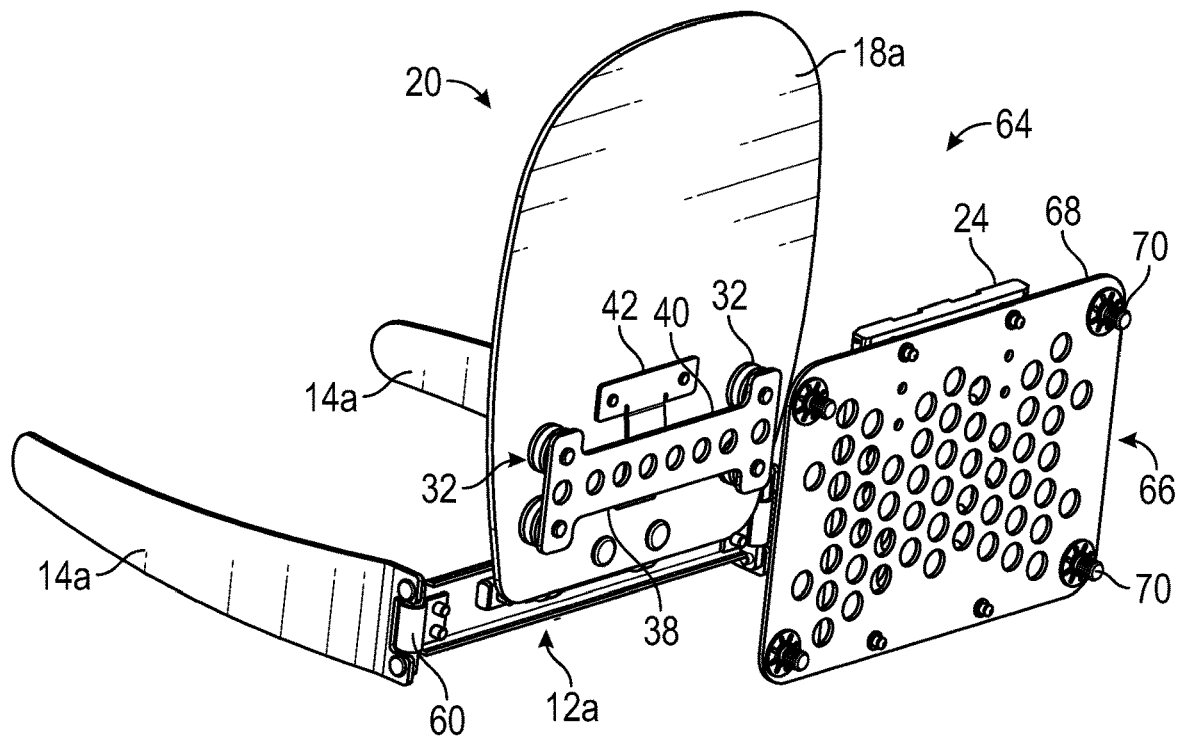
FIG. 7 is a generally perspective exploded rear view showing the user support assembly spaced apart from the seat connector assembly of the alternate form of the present invention.
Figure 8:
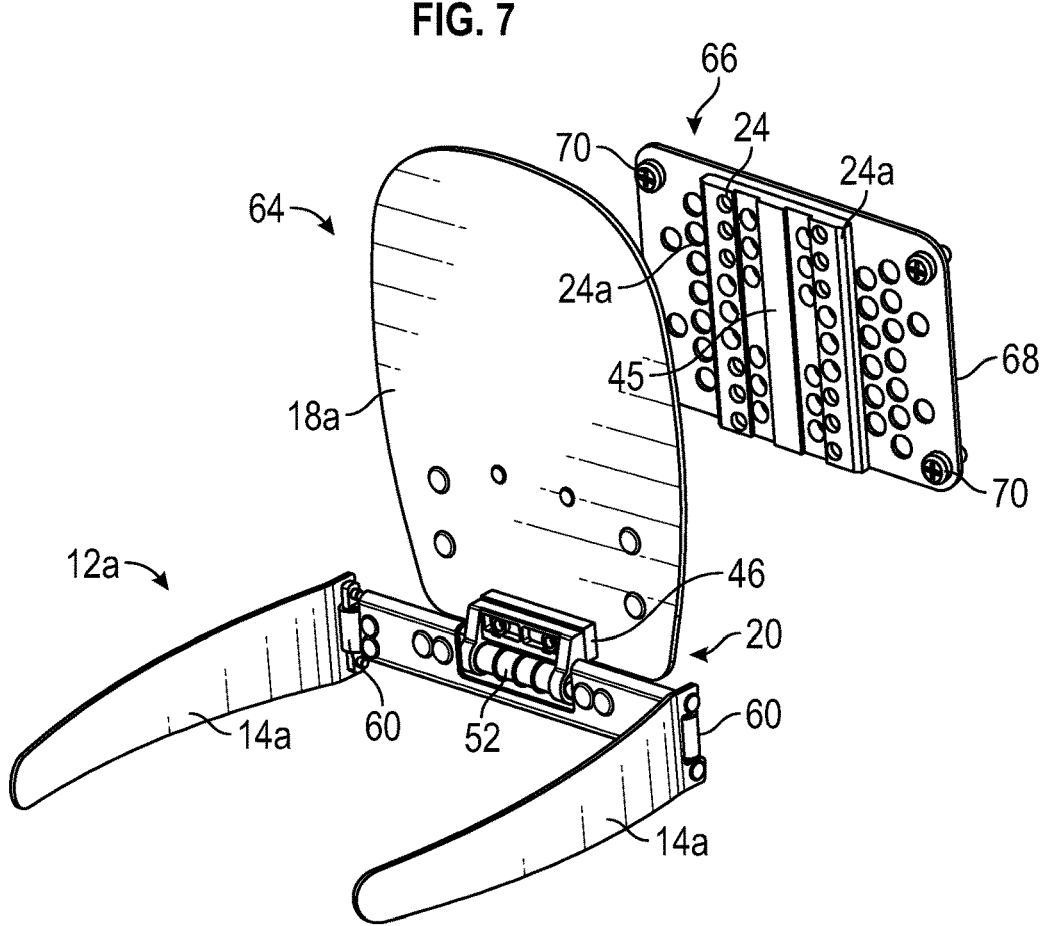
FIG. 8 is a generally perspective exploded front view showing the user support assembly spaced apart from the seat connector assembly of the alternate form of the present invention.

Referring next to FIGS. 7 and 8 of the drawings, an alternate form of the adjustable seat headrest of the invention is there illustrated and identified by the numeral 64. This form of the invention is similar in many respects to the previously described embodiment and like numerals are used in FIGS. 7 and 8 to identify like components. The primary difference between this latest embodiment of the invention and the embodiment illustrated in FIGS. 1 through 6 of the drawings resides in the differently configured mounting assembly 66. As best seen in FIG. 8, mounting assembly 66 here comprises an elongated guide 24 and a seat connector plate 68 that can be connected to the seat by suitable connectors, such as connectors 70. As in the earlier described embodiment of the invention elongated guide 24 includes oppositely disposed guide rails 24a which, as previously described, are adapted to be rollably engaged by two sets of transversely spaced apart roller assemblies 32 (FIG. 7) that are mounted on central head support plate 18a of passenger support assembly 20. However, rather than being generally triangular in shape, the connector plate 68 of the mounting assembly 66 is generally rectangular in shape.

With regard to the support assembly of this latest embodiment of the invention, this assembly is substantially identical in construction and operation to the support assembly shown in FIGS. 1 through 6 I of the drawings. As shown in FIGS. 7 and 8, the user support assembly 20 comprises adjustable neck support assembly 12a that includes first and second neck support wings 14a and a transverse neck support 16a. As before, first and second neck support wings 14a are connected to transverse neck support 16a for movement between the first stowed position and a second deployed position.

The roller assemblies 32, each of which are of identical construction, include grooved rollers 36 that roll along guide rails 24a so that the user support assembly 20 can be adjustably moved upwardly and downwardly so as to enable the desired adjustment in the height of the support assembly. A transversely extending connector member 38 spans the spaced apart rollers in the manner illustrated in FIG. 7 and defines a guide channel 40 within which guide 24 is disposed.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention as set forth in the following claims.

I claim:

1. A seat headrest assembly interconnectable able with a seat comprising:
   (a) a mounting assembly; and
   (b) a user support assembly connected to said mounting assembly, said user support assembly comprising:
      (i) a head support;
      (ii) a tilting hinge connected to said head support; and
      (iii) an adjustable neck support assembly connected to said tilting hinge, said adjustable neck support assembly comprising a transverse neck support and first and second neck support wings connected to said transverse neck support for movement between a first stowed position and a second deployed position.

2. The seat headrest assembly as defined in claim 1 in which said mounting assembly comprises a seat connector plate and an elongated guide connected to said seat connector plate.

3. The seat headrest assembly as defined in claim 1 further including transversely spaced apart roller assemblies mounted on said user support assembly.

4. A seat headrest assembly interconnectable with a seat comprising:
   (a) a mounting assembly including a seat connector plate and an elongated guide connected to said seat connector plate; and
   (b) a user support assembly connected to said mounting assembly, said user support assembly comprising:
      (i) a head support;
      (ii) a tilting hinge connected to said head support; and
      (iii) an adjustable neck support assembly connected to said tilting hinge, said adjustable neck support assembly comprising a transverse neck support first and second friction hinges connected to said transverse neck support and first and second neck support wings connected to said friction hinges for movement between a first stowed position and a second deployed position.

5. The seat headrest assembly as defined in claim 4 further including transversely spaced apart roller assemblies mounted on said user support assembly.

6. The seat headrest assembly as defined in claim 5 further including a transversely extending connector member spanning said spaced apart roller assemblies.

7. The seat headrest assembly as defined in claim 6 in which said spaced apart roller assemblies and said transversely extending connector member define a guide channel.

8. The seat headrest assembly as defined in claim 6 further including a resistance imparting assembly connected to said user support assembly for yieldably resisting movement of said user support assembly relative to said mounting assembly.

9. The seat headrest assembly as defined in claim 8 in which said resistance imparting assembly comprises a leaf spring affixed to said user support assembly.

10. A user support assembly interconnectable with a seat comprising:
   (a) a neck support assembly comprising:
      (i) a transverse connector plate;
      (ii) at least one friction hinge connected to said transverse connector plate; and
      (iii) a neck support wing connected to said friction hinge;
   (b) a tilting hinge connected to said transverse connector plate of said neck support assembly;
   (c) a central head support plate connected to said tilting hinge; and
   (d) a mounting assembly connected to said central head support plate, said mounting assembly comprising a seat connector plate and an elongated guide connected to said seat connector plate.

* * * * *